F. KOSINSKI.
PLANTING MACHINE.
APPLICATION FILED APR. 14, 1915.
1,163,831.
Patented Dec. 14, 1915.
2 SHEETS—SHEET 1.
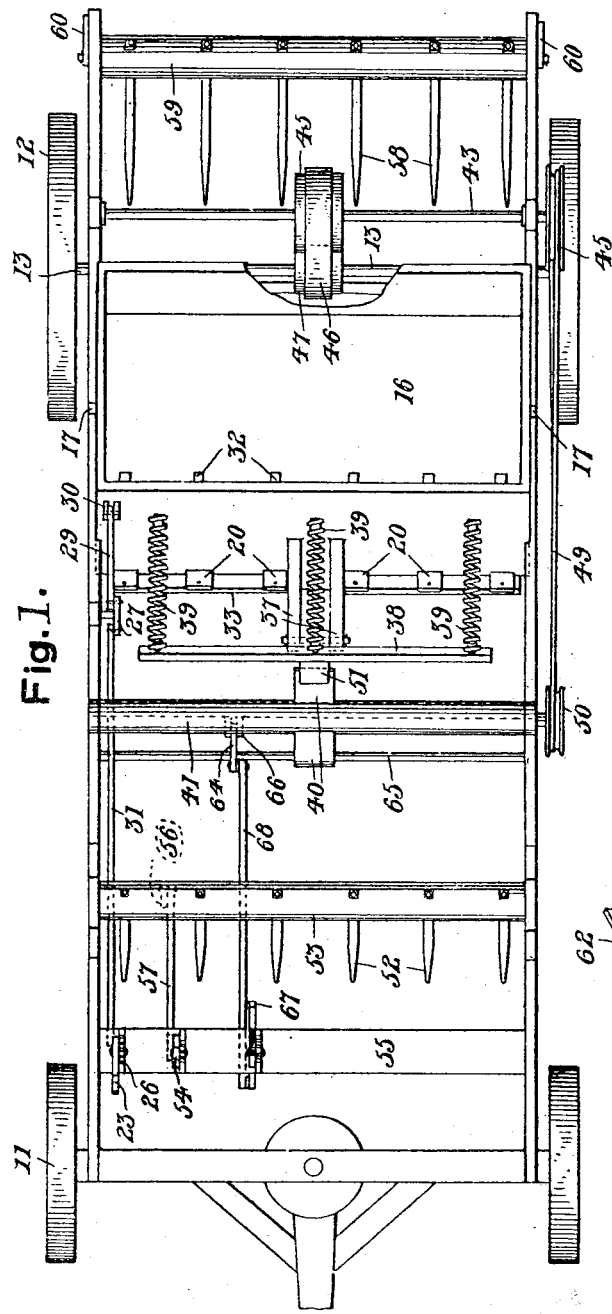
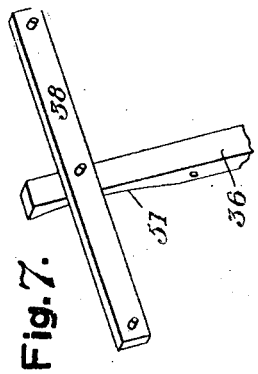
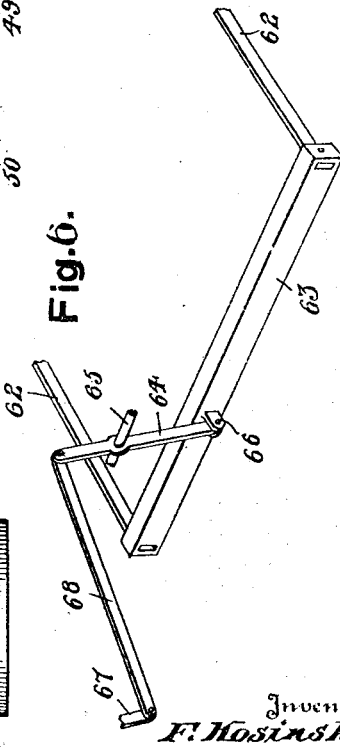
Inventor
F. Kosinski
By A. M. Wilson
Attorney F. KOSINSKI.
PLANTING MACHINE.
APPLICATION FILED APR. 14, 1915.
1,163,831.
Patented Dec. 14, 1915.
2 SHEETS—SHEET 2.
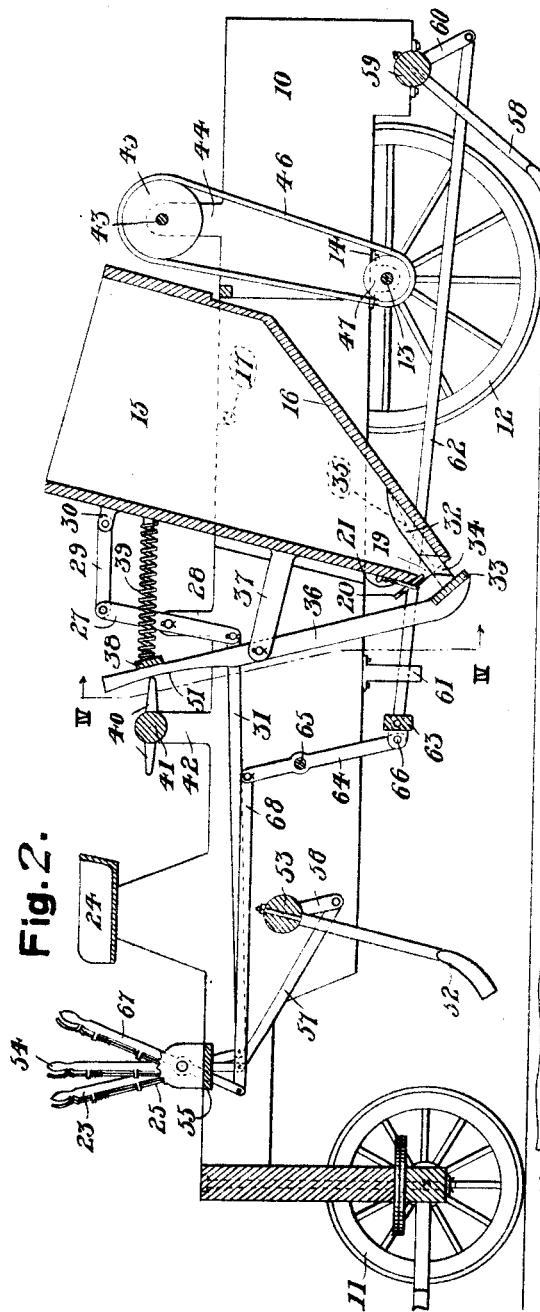
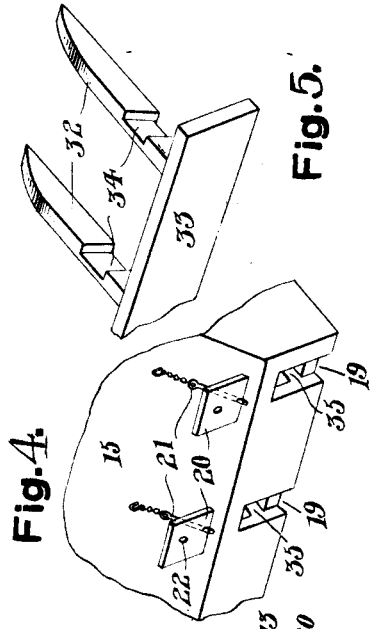
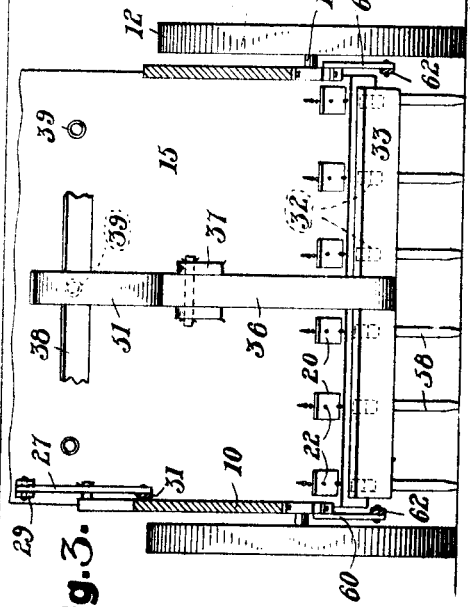
Inventor
F. Kosinski
By A. M. Wilson
Attorney

UNITED STATES PATENT OFFICE.

FRANK KOSINSKI, OF BROOKLYN, NEW YORK.

PLANTING-MACHINE.

1,163,831.  Specification of Letters Patent.  Patented Dec. 14, 1915.

Application filed April 14, 1915. Serial No. 21,252.

*To all whom it may concern:*

Be it known that I, FRANK KOSINSKI, a subject of the Czar of Russia, residing at Brooklyn, in the county of Kings and State of New York, have invented certain new and useful Improvements in Planting-Machines, of which the following is a specification.

This invention relates to new and useful improvements in planting machines.

The primary object of this device is the provision of an agricultural implement adapted for planting such larger sized seed as tubers, potatoes and other vegetables, the machine being capable of digging the receiving trenches, depositing the seed therein and then covering the same with the soil.

A further object is the provision of a vehicle adapted for propulsion across a field and provided with mechanism so arranged as to form a plurality of furrows of a desired depth in advance of automatic means for successively dropping seeds therein, the vehicle also having a rearwardly positioned furrow closing seed covering means.

A still further object is to provide an adjustably tilted seed receiving hopper upon a vehicle, the same having an automatically actuated feeding means operated from the rear axle of the vehicle.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a top plan view of the planting machine, and partially broken away. Fig. 2 is a vertical central longitudinal sectional view of the same. Fig. 3 is a transverse sectional view taken upon line IV—IV of Fig. 2. Fig. 4 is a detail perspective view of the outlet regulating device for the hopper. Fig. 5 is a perspective view of an end portion of the hopper feeder. Fig. 6 is a perspective view of a portion of the actuating means for the covering mechanism, and Fig. 7 is a perspective view of the upper part of the feeding device.

By referring to the drawings, it will be seen that the present agricultural implement is in the form of a bottomless wagon box 10 provided with the usual forward and rear wheels 11 and 12 respectively, the said rear wheels being secured to an axle 13 journaled for revolution in opposite brackets 14.

A hopper 15 in the form of a bin having an open top and with an inclined rear bottom 16 is provided exteriorly with oppositely arranged stub axles 17 journaled in opposite notches 18 upon the upper edge of the wagon box 10.

The lower end of the hopper is provided with a plurality of outlets or feed openings 19 as best shown in Fig. 4, each of which is controlled by a separate slide 20 adjustably positioned across the said outlets and adapted to be retained as desired by means of pins 21 positionable within one of the openings 22 of the respective slide.

The hopper 15 is adapted to be retained in an adjusted tilted position by means of a hand lever 23 positioned adjacent the driver's seat 24 and provided with a spring-pressed catch 25 adapted for engaging a toothed rack 26 and thus retaining the lever in its adjusted position. A link 27 is pivoted to a post 28 upon one side of the wagon box 10 and is pivotally connected at its upper end by means of a link 29 with the hopper as at 30, while the lower end of the link 27 is pivotally connected with the lower end of the hand lever 23 by means of a relatively long link 31. It will thus be seen that by shifting the hand lever 23 the hopper will be correspondingly tilted in the manner desired by the operator.

The feeding mechanism for the hopper consists of feed arms 32 secured perpendicularly upon one face of an operating board 33, the said arms being provided with cut away side notches 34, which notches allow the seed within the hopper to pass therethrough upon the outward movement of the arms 32 which latter are slidably mounted through the outlet openings 19 and rests within corresponding grooves 35 in the lower forward portion of the hopper bottom 16.

An operating arm 36 is rigidly secured centrally to the said board 33 and is pivoted to the forward free end of a post 37 carried by the hopper 15. A cross piece 38 is provided adjacent the upper end of the arm 36 and is resiliently positioned in spaced relation with the hopper by means of three coil springs 39 which connect the said hopper with the cross piece.

A cam plate 40 is carried substantially centrally upon a transversely arranged shaft 41 and extends for an equal distance upon each side of the said shaft, the shaft being journaled in opposite posts 42 of the wagon box.

A rear shaft 43 is transversely journaled in rear posts 44 carried by the wagon box and is provided with a pulley 45, while a belt 46 runs over the said pulley 45 and a similar pulley 47 carried by the rear wheel axle 13 and in this manner it will be seen that a turning of the traction wheels 12 results in revolving the shaft 43.

A pulley 48 is arranged upon the rear shaft 43 and is provided with a belt 49 running thereover and also over a similar pulley 50 upon the forward shaft 41. By this arrangement it will be evident that during the travel of the vehicle, the cam plate 40 will be turned by means of the forward shaft 41 so as to successively engage its opposite ends with the curved forwardly positioned cam face 51 of the operating arm 36 and thereby reciprocate the seed feeding arms 32 outwardly and inwardly of the hopper outlets 19.

A device is arranged at the forward end of the vehicle body for making furrows for the reception of the seed and the same consists of a plurality of hoe members 52 which are secured to a transversely journaled shaft 53 carried by the vehicle body beneath the driver's seat 24, it being understood that the said hoes are arranged directly forward and in alinement with the plurality of seed outlets 19 of the hopper.

A hand lever 54 is carried by the cross sill 55 of the wagon box and is pivotally connected at its lower end with an arm 56 of the shaft 53 by means of a connecting link 57. The said lever 54 has the usual rack and catch retaining means and it will be evident that a movement of the said lever 54 operates to elevate or lower the furrow making hoes 52 as may be found desirable.

A seed covering means is rearwardly carried by the vehicle and consists of a plurality of spaced shovel members 58 which are secured to a shaft 59 journaled transversely in the wagon box 10 and being provided with operating arms 60. Opposite spaced brackets 61 are secured to the lower edge of the opposite sides of the wagon box and each is provided with a link 62 slidably extending therethrough, the rear ends of the said link 62 being pivotally connected to the free ends of the said arms 60. A cross head 63 connects the forward ends of the said links 62.

A rocker arm 64 pivoted to a rod 65 carried by the wagon box is pivotally connected as at 66 centrally of the said head 63. A third hand lever 67 is arranged upon the forward sill 55 being provided with the usual catch and rack devices and has its lower end pivotally connected by means of a link 68 with the upper end of the said rocker arm 64. By this arrangement it will be seen that a forward and rearward movement of the lever 67 by the operator results in elevating or lowering the shovels 58.

The complete operation of the device will be apparent from the above detailed description of each of the features thereof, the hoes 52 being designed to plow parallel furrows for the reception of the seeds which are dropped therein from the hopper outlets 19 will be clear as well as the rearwardly arranged shovels 58 traveling between the furrows which close the furrows and cover up the seeds which have been deposited therein. The sowing of the seeds in spaced relations to each other is arranged by means of the automatically actuated feeding arms 32 which are reciprocated in the manner hereinbefore set forth whenever the vehicle travels along the field while the depth at which the hoes and shovels operate is regulated by means of the aforementioned hand levers 54 and 57 respectively. The feed of the seed from the hopper is also governed by means of the regulating slides 20 and the required tilting of the hopper through the agency of the hand lever 23. The implement is therefore serviceable in completing the seed sowing operation upon a single passing of the device across the field, the rows of seed being sown in equal parallel relations and the seed being separated in the rows as desired.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What I claim as new is:—

1. An agricultural implement comprising a vehicle having a body, a tiltable seed hopper carried thereby, and having spaced feeding mouths at its lower end, tilting adjusting means for the said hopper and automatically operated feeding means for each of the said mouths extending upwardly through the mouths into the hopper and operated upon propulsion of the vehicle.

2. An agricultural implement comprising a vehicle having a body, a tiltable seed hopper carried thereby, and having spaced feeding mouths at its lower end, tilting adjusting means for the said hopper automatically operated feeding means for each of the said mouths, forwardly positioned furrow hoes and rearwardly positioned covering shovels carried by the said vehicle in alinement with the respective intermediately positioned feeding mouths and manually operable means for shifting the hoes and shovels into operative and inoperative positions.

3. An agricultural implement comprising a body, a seed hopper trunnioned upon said body and having a plurality of feeding mouths at its lower end and being further provided with an inclined bottom having longitudinal slots opening at the said mouths, feeding arms positioned through the said mouths and slidably arranged within the said slots and being provided with seed feeding side notches, and automatic reciprocating means for the said arms.

4. An agricultural implement comprising a body, a seed hopper trunnioned upon said body and having a plurality of feeding mouths at its lower end and being further provided with an inclined bottom having longitudinal slots opening at the said mouths, feeding arms positioned through the said mouths and slidably arranged within the said slots and being provided with seed feeding side notches, a connecting board perpendicularly secured to the said arms, an operating arm centrally attached to the said board and pivotally connected to one side of the hopper and having a cam face upon its forward side adjacent its upper end, resilient spacing means between the said hopper and the upper end of the said operating arm, a transversely journaled shaft upon said body, a cam plate upon said shaft extending radially at opposite sides thereof and adapted for engaging the said arm cam face, a revoluble axle journaled upon said body and operative connections between the said axle and said shaft.

5. A planting machine comprising a frame, supporting wheels therefor, a seed hopper pivotally mounted on said frame, manually controlled means associated with said hopper whereby the tilting position of the same is controlled, independent outlets for the lower end of said hopper, independently operated sliding gates for closing said outlets, shiftable fingers disposed within said outlet, shiftable means supporting said fingers and means engaging said shiftable means for reciprocating said fingers.

6. A planting machine comprising a frame, a seed hopper pivotally supported on said frame, said hopper having gate controlled exit openings at the lower end thereof, fingers extending into said openings and means operated by the rear axle for reciprocating said fingers.

7. A planting machine comprising a frame, a seed hopper mounted on said frame, there being exit openings in the lower end of said hopper, automatically reciprocating fingers extending into said openings, said fingers being grooved at certain points to permit the contents of the hopper being fed therefrom to said opening and finger grooves.

8. A planting machine comprising a frame and supporting wheels therefor, a seed hopper mounted on said frame, reciprocating fingers extending into said hopper, said fingers being constructed to permit a predetermined amount of seed to be fed from said hopper and means for reciprocating said fingers including axle operated mechanism for shifting the same in one direction and resilient means for shifting the same in the opposite direction.

9. A planting machine comprising a frame and supporting wheels therefor, a seed hopper pivotally mounted on said frame and having a plurality of seed exit openings, means for controlling the angular position of said hopper and shiftable means extending upwardly into said hopper openings and partially removable therefrom for feeding seed in predetermined quantities.

10. A planting machine comprising a frame and supporting wheels therefor, a seed hopper pivotally mounted on said frame, means for controlling the angular position of said hopper relative to said frame, there being a series of openings in the lower end of said hopper independently operating closure gates for said openings and reciprocating means extending into said hopper through said openings for removing the contents from the hopper in predetermined quantities.

In testimony whereof I affix my signature in presence of two witnesses.

FRANK KOSINSKI.

Witnesses:
 Edw. A. Kovacs,
 George Litwin.